US006886444B2

(12) United States Patent
Reid

(10) Patent No.: US 6,886,444 B2
(45) Date of Patent: May 3, 2005

(54) APPARATUS FOR CUTTING HOLES IN MUNITIONS

(75) Inventor: John Nicholas Reid, Great Wakering (GB)

(73) Assignee: Disarmco Limited, Essex (GB)

( * ) Notice: Subject to any disclaimer, the term of this patent is extended or adjusted under 35 U.S.C. 154(b) by 125 days.

(21) Appl. No.: 10/204,801

(22) PCT Filed: Feb. 23, 2001

(86) PCT No.: PCT/GB01/00757

§ 371 (c)(1),
(2), (4) Date: Aug. 23, 2002

(87) PCT Pub. No.: WO01/62455

PCT Pub. Date: Aug. 30, 2001

(65) Prior Publication Data

US 2003/0010183 A1 Jan. 16, 2003

(30) Foreign Application Priority Data

Feb. 25, 2000 (GB) .............................................. 0004444

(51) Int. Cl.[7] .......................... F42B 33/06; B23P 17/04
(52) U.S. Cl. ............................ 86/50; 29/426.4; 29/700
(58) Field of Search ............................ 86/50; 29/426.4, 29/700

(56) References Cited

U.S. PATENT DOCUMENTS 5,372,540 A * 12/1994 Burch et al. ................ 452/156
5,472,367 A * 12/1995 Slocum et al. ................. 451/5
5,524,545 A * 6/1996 Miller et al. ................ 102/293
5,991,995 A * 11/1999 Gabbey ..................... 29/426.4
6,212,986 B1 * 4/2001 Decker et al. ................. 86/49
6,559,413 B1 * 5/2003 Muenchausen et al. 219/121.72

FOREIGN PATENT DOCUMENTS

| | | |
|---|---|---|
| DE | 42 21 666 | 1/1994 |
| DE | 44 40 208 | 5/1996 |

OTHER PUBLICATIONS

Shapiro, I I, "Unit for Contour Cutting of Nonmetal Materials with a High–pressure Water Jet," Russian Engineering Research, Allerton Press, New York, vol. 12, No. 9, 1992, pp. 45–47.

* cited by examiner

*Primary Examiner*—Teri P. Luu
*Assistant Examiner*—Bret Hayes
(74) *Attorney, Agent, or Firm*—Smith-Hill and Bedell

(57) ABSTRACT

An apparatus for cutting into a cylindrical munition, comprising a cutting head and a mechanism for moving the cutting head relative to the surface of the munition. The mechanism for moving the cutting head constrains the cutting head to follow a linear path in one direction, to be positioned in use parallel to the axis of the munition, and an arcuate path in the plane normal to the first direction to follow the contour of the munition.

13 Claims, 4 Drawing Sheets

APPARATUS FOR CUTTING HOLES IN MUNITIONS

FIELD OF THE INVENTION

This invention relates to the deactivation of unexploded munitions.

BACKGROUND OF THE INVENTION

It is known to render an unexploded munition harmless by cutting through the casing of the munition. Cutting of a large hole itself relieves the pressure and allows the contained explosive to be incinerated without the munition exploding. It is also possible to cut-out and remove the fuse. Because of the danger of the munition exploding while it is being cut, it is important to use a cutting mechanism that can be remotely controlled, to avoid risk of injury to the personnel disposing of the munition. It is also important that the equipment should not have any form of magnetic signature as this could itself set off the munition.

Known equipment for performing this task (somewhat similar to that described in U.S. Pat. No. 4,703,591 though this patent is only concerned with cutting through glass) consists of a frame that can be placed over the unexploded munition and that movably supports a cutting mechanism. The cutting mechanism is a nozzle connected to a high pressure supply of water containing a suspension of abrasive particles such as garnet or olivine.

In the known equipment, the tip of the nozzle always remains in a flat plane. The nozzle is supported on a carrier and can rotate about an axis relative to the carrier to cut a circle in the munition. Furthermore the carrier can be moved in a straight line to allow the cutter to cut another circle or to enable the nozzle to cut in a straight line.

The known mechanism has an important disadvantage in that when cutting along a circle, or along any line transverse to the axis of the cylindrical munition, the distance of the nozzle from the surface of the munition is constantly changing and the movement of the nozzle must therefore be skilfully controlled to reduce the speed of movement of the nozzle as its distance from the cylindrical surface of the munition increases.

Aside from the skill required in controlling the movement of the cutting nozzle, the known mechanism only allows controlled cutting in one dimension. Once a desired line or circle has been cut, the operator must return to the frame and reposition it so that further lines may be cut. This can potentially result in several trips back to the danger area before the munition can be declared safe.

DE 4221666 describes an arrangement intended for cutting through munitions. In this case, the munition is itself rotated beneath the cutting head so that a cut is made around the entire periphery of the munition. Such apparatus is totally unsuited to the deactivation of unexploded munition which are too sensitive to be handled in this way.

OBJECT OF THE INVENTION

The present invention seeks therefore to provide an apparatus that can cut a large hole in the wall of a cylindrical unexploded munition in a simple and effective manner without requiring skilled manipulation of the movement of the cutting head of the apparatus and without requiring the munition to be moved.

SUMMARY OF THE INVENTION

According to the present invention, there is provided an apparatus for cutting into a cylindrical munition, comprising a cutting head and means for moving the cutting head relative to the surface of the munition, wherein the means for moving the cutting head constrain the cutting head to follow a linear path in one direction, to be positioned in use parallel to the axis of the munition, and in an arcuate path in the plane normal to the first direction to follow the contour of the munition.

Preferably, the moving means comprises a fixed frame to be positioned adjacent the munition, a carriage movable relative to the fixed frame in the first direction, and a cutting head carrier supported for movement on the carriage and guided to follow an arcuate path centred in use on the axis of the munition.

Munitions to be deactivated are generally cylindrical devices therefore the movement provided in the present invention allows the cutter to easily perform any cuts on the surface of the munition that the task may require. By providing a linear movement parallel to the axis of the bomb, straight lines along its length may be cut. The provision of an arcuate path allows the cutting head to follow the circumference of the cylinder by arranging the frame in such a position that the axis of the munition and the axis of the arcuate path coincide.

In the present invention, the head can remain at a substantially constant distance from the surface of the munition throughout the cutting operation, thereby removing the skill required to control the movement of the cutting head. A constant speed can be maintained that is dependent only on the cutting efficiency of the head and the thickness of the wall of the munition. Furthermore, without returning to the site of the munition, it is possible to define any closed path for the movement of the head, enabling a hole of any shape or size to be cut in the wall of the munition.

As the diameter of munition can vary, it is desirable for the cutting head to be adjustably mounted on the carrier to accommodate munitions of different diameters.

It is also advantageous to use air powered motors to move the carriage and the carrier through respective reduction gearboxes and lead screws. This avoids the need for an electric current and enables the motor and transmission mechanism to be formed of a material such as aluminium that does not have any magnetic signature.

To permit remote closed loop feedback control of the movement of the cutting head, shaft encoders may be provided to transmit to a remote monitoring station the current position of the cutting head. Once again, to avoid electric current and any magnetic field, the shaft encoders should desirably the connected by optical fibres to the remote monitoring station.

As is already known per se, it is preferred to use as the cutting head a nozzle operative to direct a high pressure jet of fluid containing a suspension of abrasive particles onto the surface of the munition. Aside from being efficient at cutting through the casing of the munition, the high pressure water cools the casing during the cutting to minimise the risk of the munition being set off accidentally.

In the prior art mechanism mentioned above, the abrasive particles are stored in a large tank having an inlet for high pressure water and a separate outlet the water containing the suspension of abrasive particles. A large tank is used, which cannot be carried easily and when it is empty it is refilled on site. There is a risk when refilling the tank that dirt particles of large diameter may enter alongside the abrasive material and such dirt can damage or block the nozzle.

In the preferred embodiment of the present invention, the abrasive particles are stored in a replaceable canister connected at a T-junction to a high pressure water line leading to the nozzle. The canister is small enough to be carried by one person, and is replenished under clean and controlled conditions. Furthermore, to facilitate the replacement of the canister, a single connection to the canister incorporates an inlet for high pressure water and an outlet for the mixture of high pressure water and particulate abrasive.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
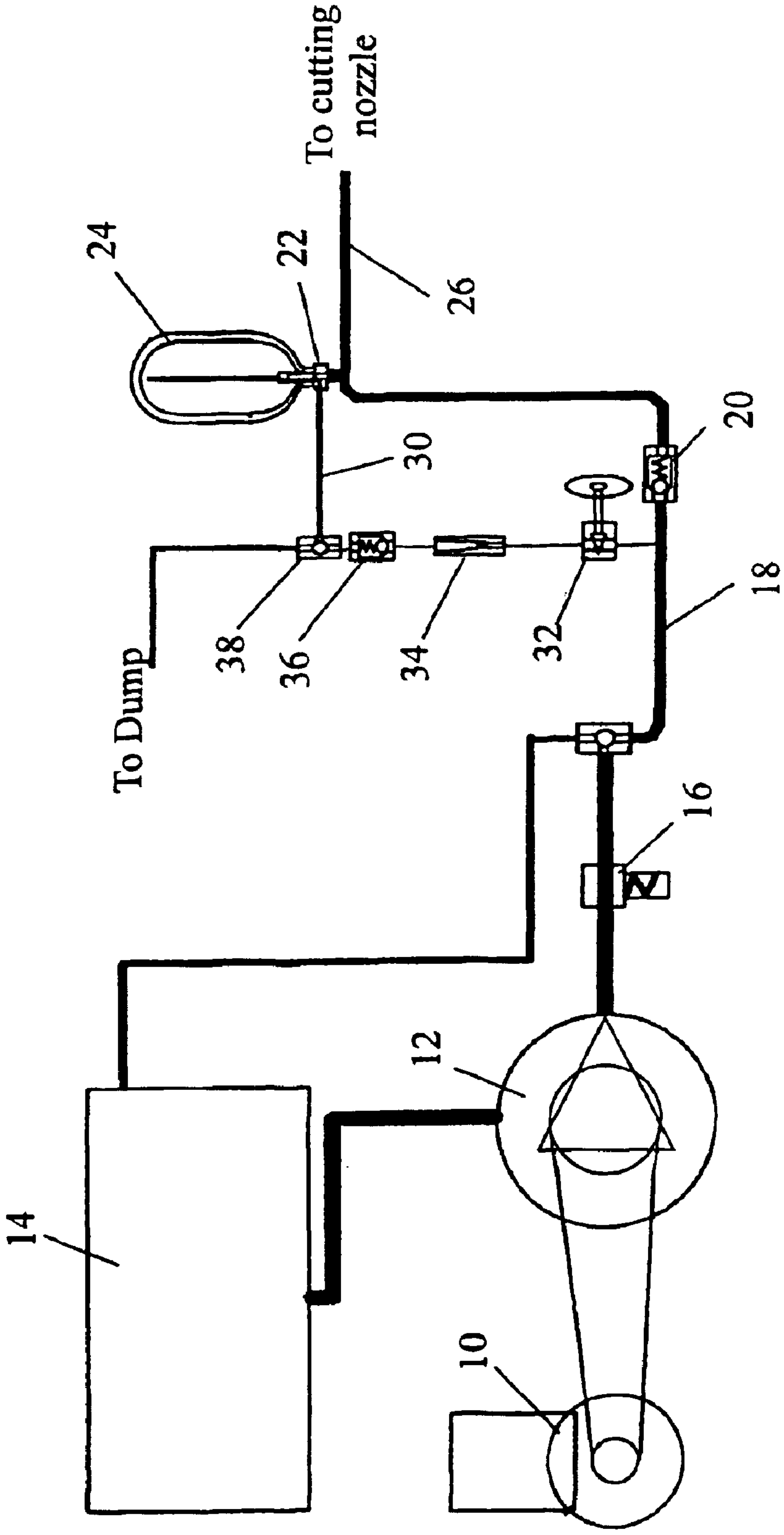
FIG. 1 is schematic diagram of the high pressure hydraulic system employed in the preferred embodiment of the present invention.

The cutting apparatus illustrated in FIG. 1 comprises three separate assemblies connected to one another by various hydraulic lines. The first assembly consists of a diesel engine 10 (such as a Ruggerini MD 191) driving a high pressure pump 12 (such as a Speck NP25/12-500) that generates an output pressure of around 7000 psi. The pump 12 draws water from a supply tank 14. The output pressure is limited by a pressure relief valve 16 which dumps excess water back into the supply tank 12.

The water under pressure flows through a line 18 containing a non-return valve 20 to the second assembly. The second assembly comprises a canister 24 containing an abrasive such as garnet powder or olivine, which is connected to the line 18 by a T-junction 22. At this junction, a suspension of abrasive is added from the canister 24 into the water which is then fed by way of a further high pressure line 26 to a cutting nozzle that forms part of the third assembly, to be described below with reference to FIGS. 3 and 4.

Figure 2:
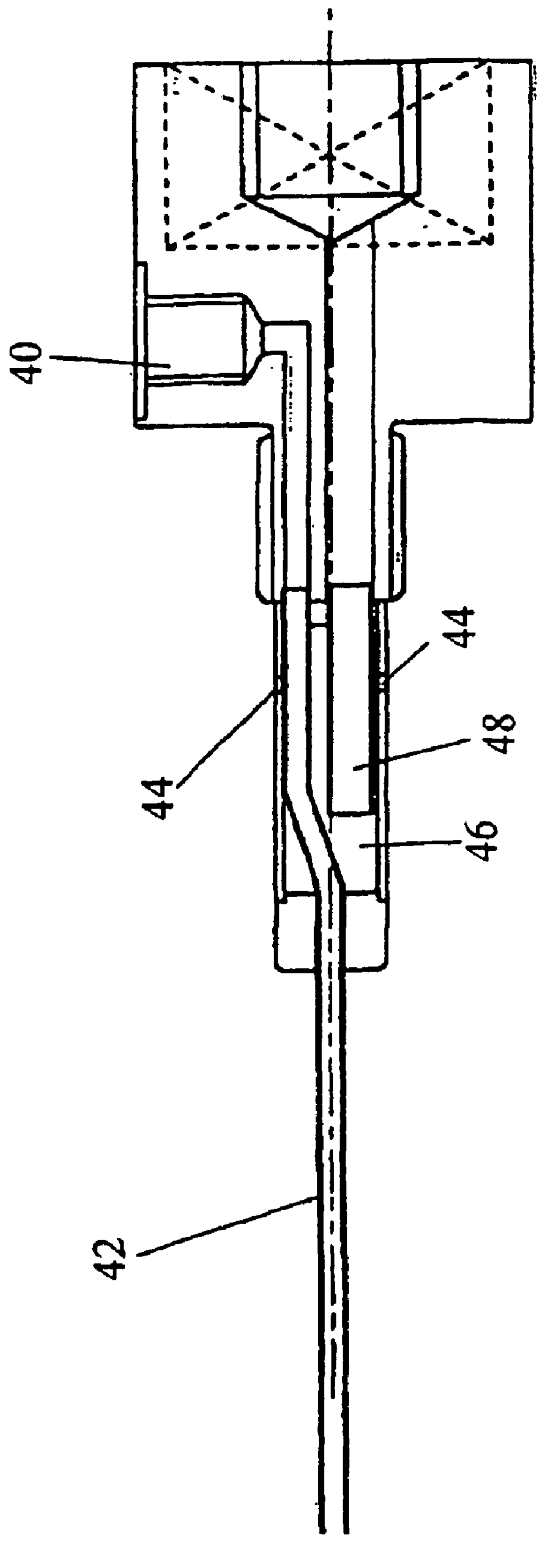
FIG. 2 is a section through the fixing used to attach the canister to the high pressure water system.

To force the garnet powder out of the canister 24, a line 30 containing a needle valve 32, a flow meter 34, a non-return valve 36 and valve shut off valve 38 leads from a point upstream of the non-return valve 20 to an inlet in the valve at the neck of the canister 24 which is shown in greater detail in FIG. 2. In particular, the high pressure water in the line 30 is supplied at a regulated and measured rate into a port 40 which is connected to a tube 42 immersed in the powder in the canister 24. The water pressure in the canister is greater than the water pressure at the T-junction 22 (on account of the pressure drop created by the non-return valve 20) and this forces water carrying garnet powder through holes 44 into a chamber 46 that is connected to the T-junction 22 through a shorter tube 48. By varying the quantity of water flowing through the line 30, it is possible to regulate the concentration of abrasive in the water supplied to the cutting nozzle.

The valve 38 shuts off the line 30 while allowing clean water to flow through the line 26 and the cutting nozzle, to prevent them from being clogged with abrasive powder.

The system as described so far differs from prior art equipment in that a single connector at the neck of the canister 24 allows water to be introduced into the canister and water carrying abrasive powder to be extracted from the canister. Hence once the canister is empty of powder, it can be replaced by undoing a single connector. Because of the ease of replacement, the canister can be made relatively small, enabling it to be carried and replaced by a single person. This also adds to the portability of the equipment, which is of prime importance having regard to the terrain over which such equipment often needs to be carried.

A further advantage is achieved by using replaceable pre-filled canisters in that the canisters can be filled under controlled conditions thereby ensuring that no dirt can be introduced into the system, to risk blocking the cutting nozzle.

Figure 3:
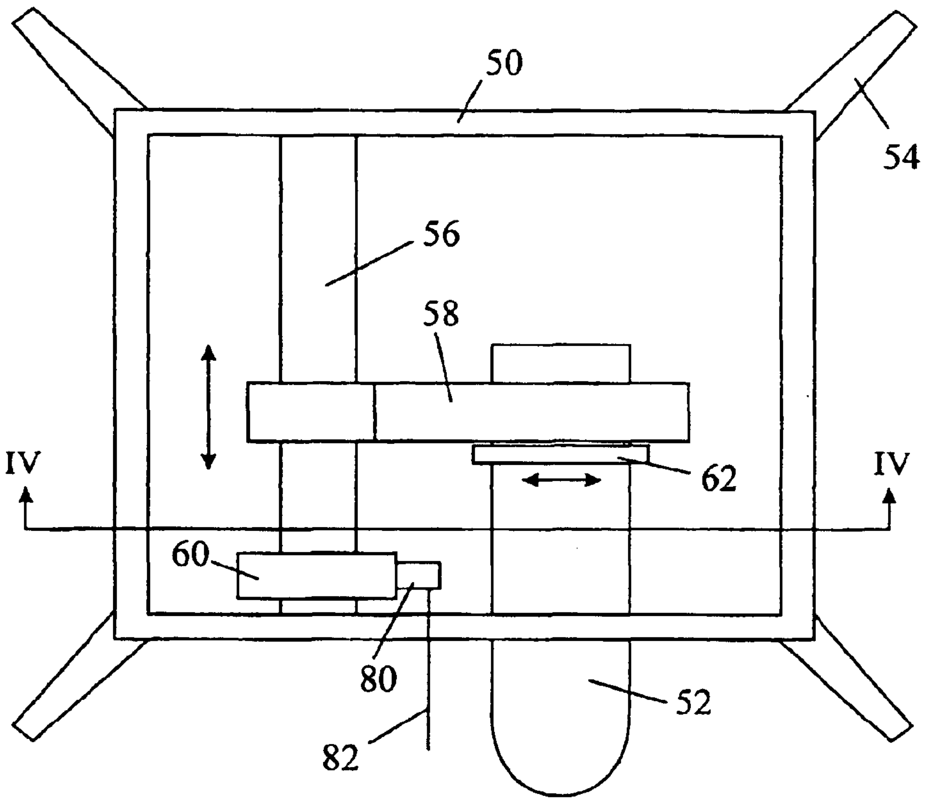
FIG. 3 is a plan view of the frame to be located about a munition, the drawing showing the carriage, carrier and cutting head.
Figure 4:
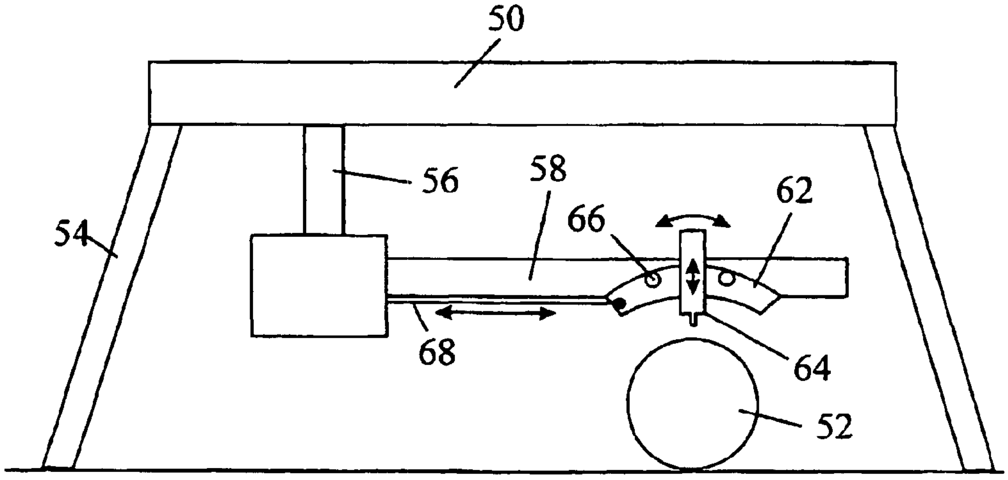
FIG. 4 is a side view of the frame of FIG. 3 as viewed in the direction of the arrows IV—IV in FIG. 3, showing the arcuate path of movement of the carrier relative to the carriage.

The third station shown in FIGS. 3 and 4 is a nozzle manipulator which can move the cutting nozzle over the surface of the munition in a controlled manner. This station needs to be physically separated from the other two because it cannot have a magnetic signature nor should it carry an electric current that might set off the munition.

The manipulator, as shown in FIGS. 3 and 4, comprises a frame 50 that stands above the munition 52 on four legs 54 that are all telescopically adjustable. Suspended from the frame 50 is a fixed gantry 56 along which there is movably mounted a carriage 58. The carriage 58 can be moved along the gantry 56 by means of an air motor 60 fitted with a reductions gearbox and driving a lead screw which threadedly engages with a nut connected to the carriage 58. In use, the frame 50 is positioned and the lengths of the legs 54 are individually adjusted such that the gantry 56 lies generally parallel to the axis of the munition 52.

A carrier 62 supporting the cutting nozzle 64 is mounted on the carriage 58 in such a manner as to enable the nozzle 64 to move in a circle centred on the axis of the munition. To this end, the carriage 58 supports two fixed rollers 66 and the carrier 64 has an arcuate surface that rests on the rollers 66. Through a pivoted connecting rod 68, represented schematically in FIG. 4, the carrier is connected to a second air motor and reduction gearbox that is mounted on the carriage 58.

To cope with munitions having different diameters, the radial position of the nozzle 64 on the carrier is adjustable as represented by the vertical double headed arrow in FIG. 4.

Shaft encoders are provided (only the encoder 80 associated with the motor 60 being represented in the drawing) to determine the position of the carriage 58 along the gantry 56 and the extension of the connecting rod 68 to allow the actual position of the cutting nozzle 64 to be relayed by optical fibres 82 to the second of the stations, where the cutting path can be programmed by an operator into a computer which may then remotely control the movement of the nozzle 64 using closed loop control to follow the desired path.

In the prior art equipment, the requirement for manual control necessitated the use of visual monitoring equipment, i.e. a closed circuit television system, and though such equipment may be provided to reassure the operator of correct operation of the equipment, it is not essential to the performance of the apparatus.

Figure 5:
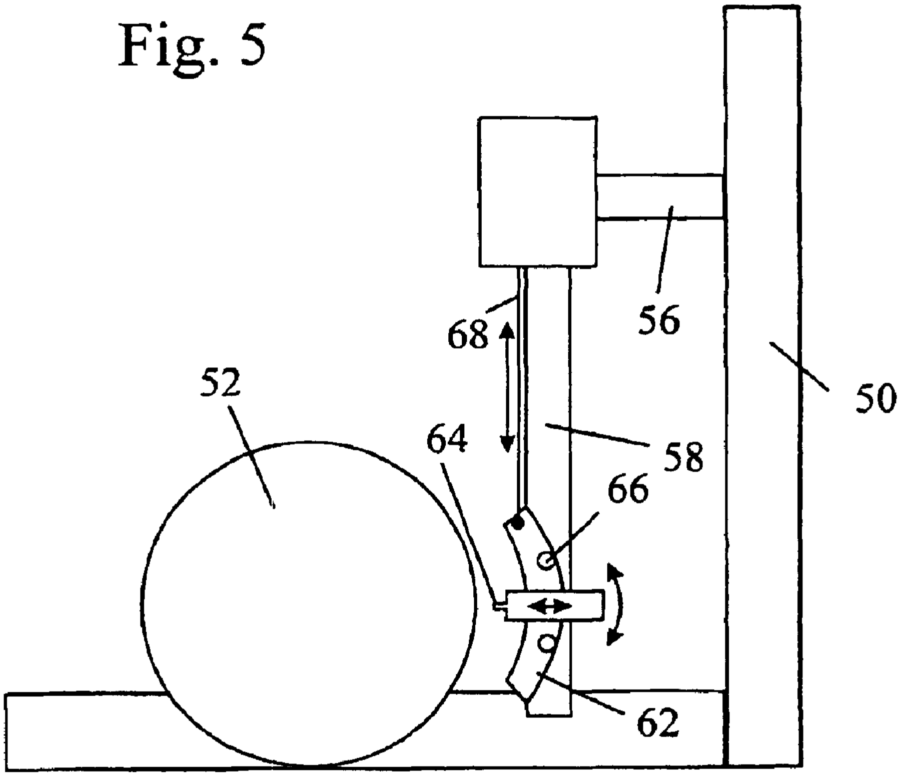
FIG. 5 is a similar side view to that of FIG. 4 showing an alternative embodiment of the invention in which the frame is intended to stand to one side of the munition instead of straddling it.

The apparatus of the embodiment of FIGS. 3 and 4 is essentially the same as that of FIG. 5 and to avoid repetition of the description, the same reference numerals have been allocated to components that serve the same function as previously described. The important difference to note is that the frame 50 is designed to stand to one side of the munition instead of straddling it. Suitable adjustable feet (not shown) are provided on the frame to allow it to be positioned, as previously, so that the carriage 58 moves parallel to the axis of the cylindrical munition 52 and the arc of the cutting head is centered on the axis of the munition.

This embodiment has the advantage that the manipulator can be positioned next to the munition and does not have to be carried over it. Furthermore, the cutting head now cuts a hole in the side rather than the top of the munition and this has the advantage that the removed metal tends simply to fall out of the hole that has been created, By contrast, when cutting a hole from above, the removed metal drops into the hole and its withdrawal from the hole creates an unnecessary problem.

What is claimed is:

1. An apparatus for cutting into a munition having a casing with a cylindrical external surface and a central axis, comprising a cutting head and means for moving the cutting head relative to the external surface of the casing along a closed path, characterised in that the means for moving the cutting head constrain the cutting head to follow a linear path in a first direction, to be positioned in use parallel to the central axis of the casing, and an arcuate path in a plane normal to the first direction so as to remain at a constant distance from the external surface of the casing, whereby the cutting head cuts a piece out of the casing of the munition without requiring the munition to be moved.

2. An apparatus as claimed in claim 1, wherein the moving means comprises a fixed frame to be positioned adjacent the munition, a carriage movable relative to the fixed frame in the first direction, and a cutting head carrier supported for movement on the carriage and guided to follow an arcuate path centered in use on the central axis of the casing.

3. An apparatus as claimed in claim 2, wherein the cutting head is adjustably mounted on the carrier to accommodate munitions of different diameters.

4. An apparatus as claimed in claim 2, wherein air powered motors are provided for moving the carriage and the carrier through respective reduction gearboxes and lead screws.

5. An apparatus as claimed in claim 4, wherein shaft encoders are provided to permit remote monitoring of the position of the cutting head.

6. An apparatus as claimed in claim 5, wherein optical fibers are provided for transmitting signals from the shaft encoders to a remote monitoring location.

7. An apparatus as claimed in claim 1, wherein the cutting head is a nozzle operative to direct a high pressure jet of fluid containing a suspension of abrasive particles onto the external surface of the casing.

8. An apparatus as claimed in claim 7, wherein the fluid is water and the abrasive particles are stored in a replaceable canister connected at a T-junction to a high pressure water line leading to the nozzle.

9. An apparatus as claimed in claim 8, wherein a single connection to the canister incorporates an inlet for high pressure water and an outlet for a mixture of high pressure water and particulate abrasive.

10. An apparatus as claimed in claim 7, wherein said means constrain the cutting head to remain at a constant orientation relative to the central axis of the casing during movement of the cutting head along the closed path.

11. An apparatus according to claim 1, comprising a frame, an elongate gantry member attached to the frame, a carriage mounted on the gantry member and constrained to move longitudinally of the gantry member, and a first drive means coupled to the carriage for moving the carriage relative to the gantry member, and wherein the cutting head is mounted on the carriage and is constrained to move relative to the carriage along said arcuate path, and the apparatus further comprises a second drive means coupled to the cutting head for moving the cutting head relative to the carriage.

12. A method of cutting into a munition having a casing with a cylindrical external surface and a central axis, comprising:

positioning a cutting head in cutting relationship with the external, surface of the casing, moving the cutting head relative to the external surface of the casing along a closed path, and constraining the cutting head to follow a linear path in a first direction parallel to the central axis of the casing and an arcuate path in the plane normal to the first direction so as to remain at a constant distance from the external surface of the casing.

13. A method as claimed in claim 12, comprising constraining the cutting head to remain at a constant orientation relative to the central axis of the casing as the cutting head moves along the closed path.

* * * * *